United States Patent [19]

Huang

[11] Patent Number: 4,562,898

[45] Date of Patent: Jan. 7, 1986

[54] TUNABLE POWERTRAIN MOUNT

[75] Inventor: Bernard Huang, Canton, Mich.

[73] Assignee: Ford Motor Company, Dearborn, Mich.

[21] Appl. No.: 616,983

[22] Filed: Jun. 4, 1984

[51] Int. Cl.⁴ .......................... B60K 1/00; F16F 7/00
[52] U.S. Cl. .................................. 180/292; 267/141.3
[58] Field of Search ................. 180/292, 312, 291; 267/63 A, 141.1, 141.2, 141.3

[56] References Cited

U.S. PATENT DOCUMENTS

| | | | |
|---|---|---|---|
| 2,272,270 | 2/1942 | Krotz | 16/44 |
| 3,913,696 | 10/1975 | Kennedy et al. | 180/312 |
| 4,188,048 | 2/1980 | Haung et al. | 267/63 A |

Primary Examiner—Carlton R. Croyle
Assistant Examiner—Timothy S. Thorpe
Attorney, Agent, or Firm—Peter Abolins; Robert D. Sanborn

[57] ABSTRACT

A tunable powertrain mount for use in an automobile has a shear disc suspension coupled between a frame rail and a cross member supporting the powertrain. The shear disc suspension has two elastomer discs interleaved between three support plates. The shear disc suspension is tunable as a function, at each deformation stage, of load, displacement, stiffness and frequency, and as a function of area, support mass, shear modules of the elastomer and maximum shear strain.

6 Claims, 8 Drawing Figures

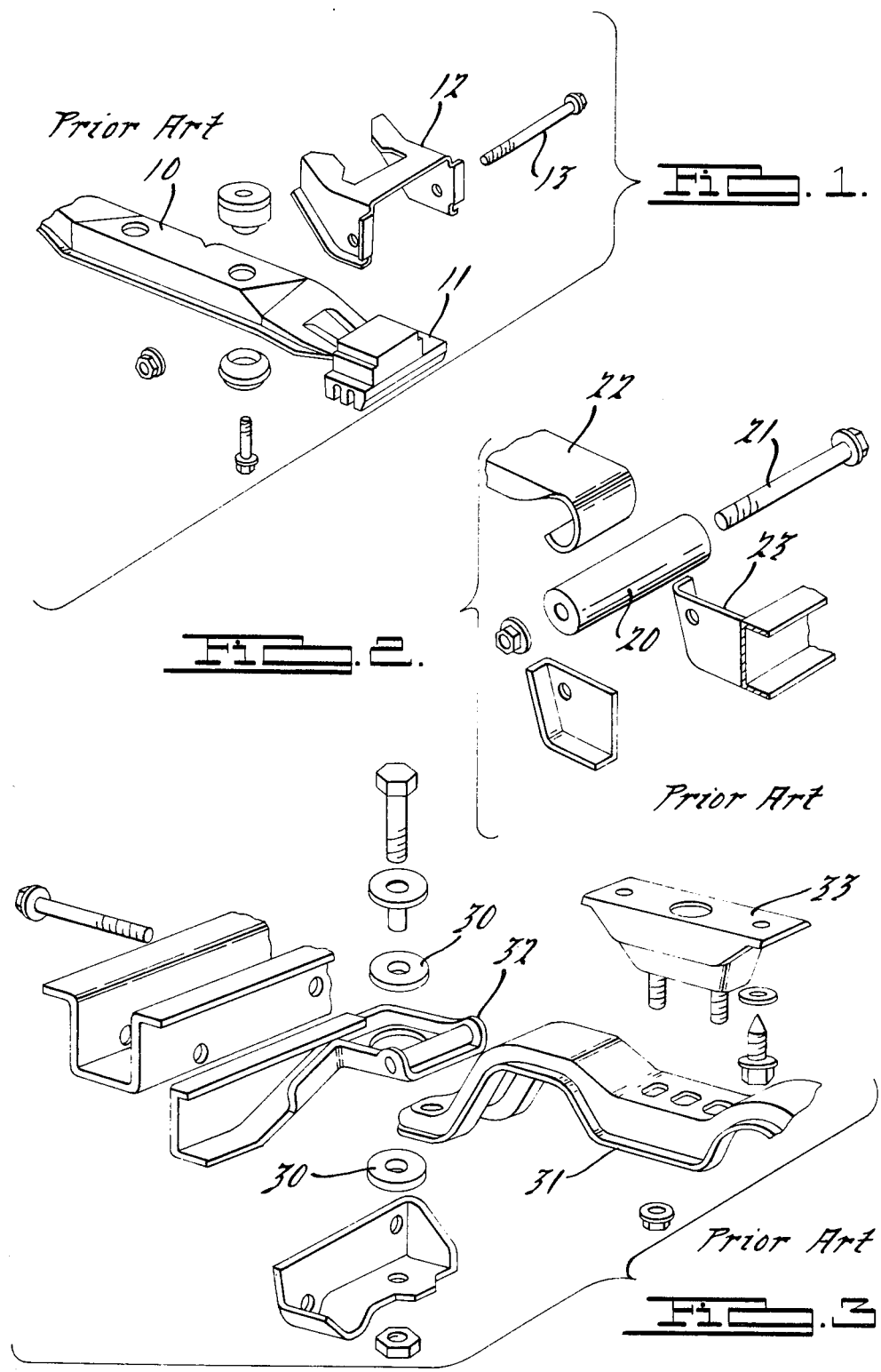

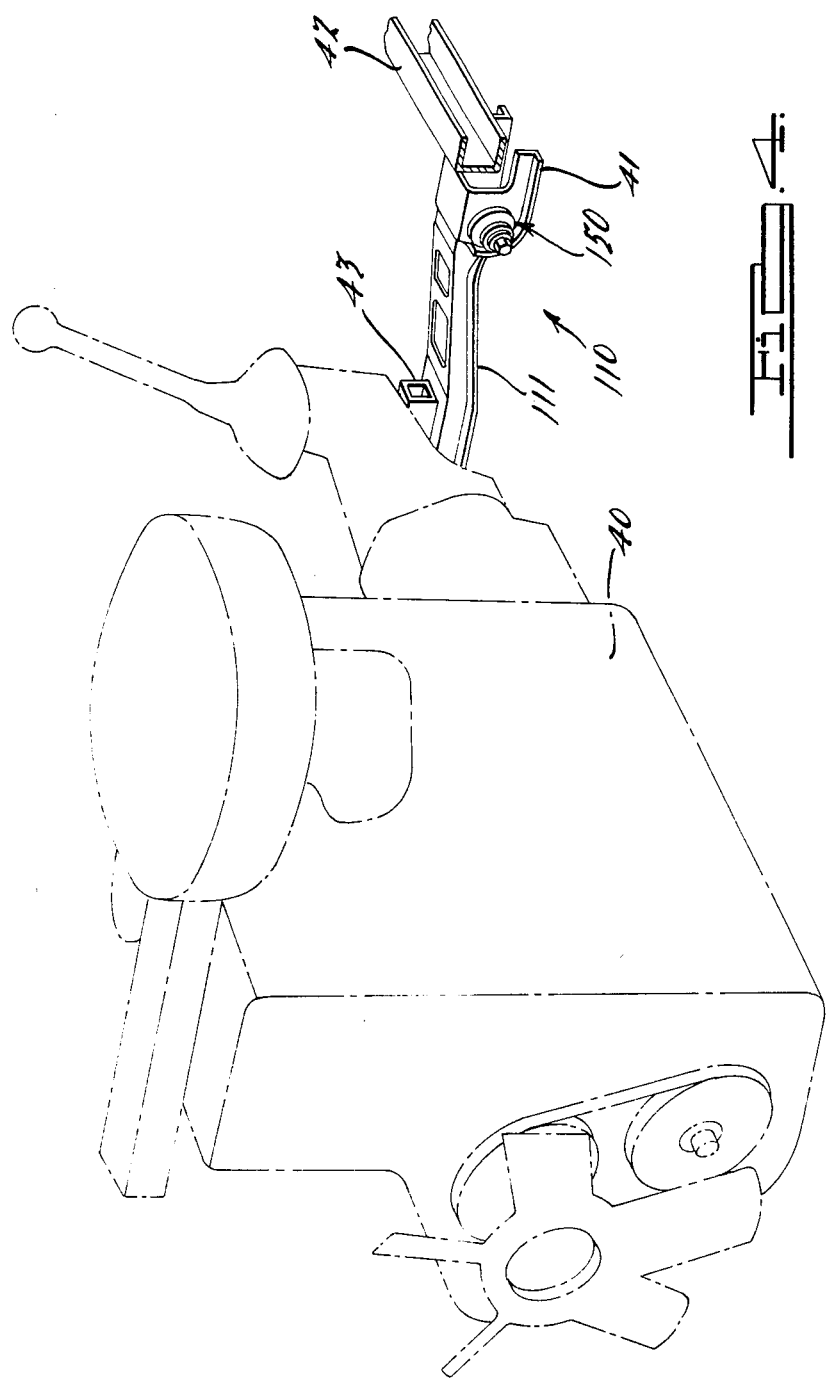

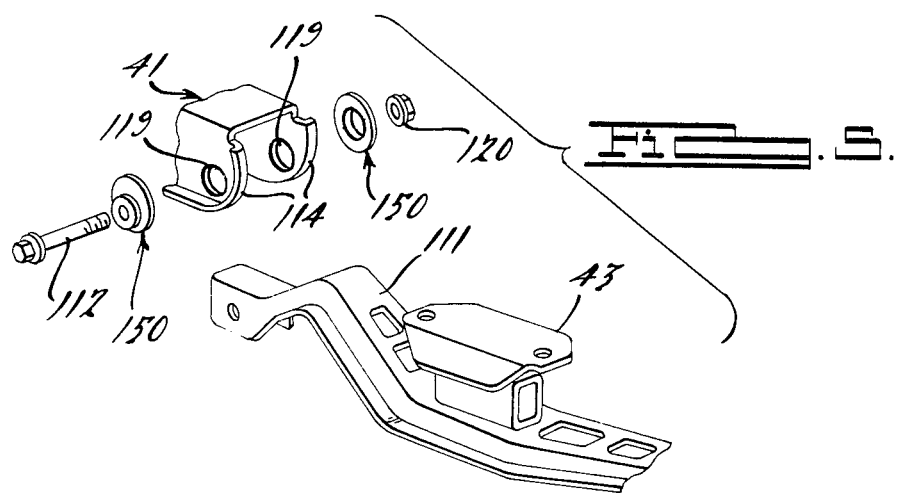
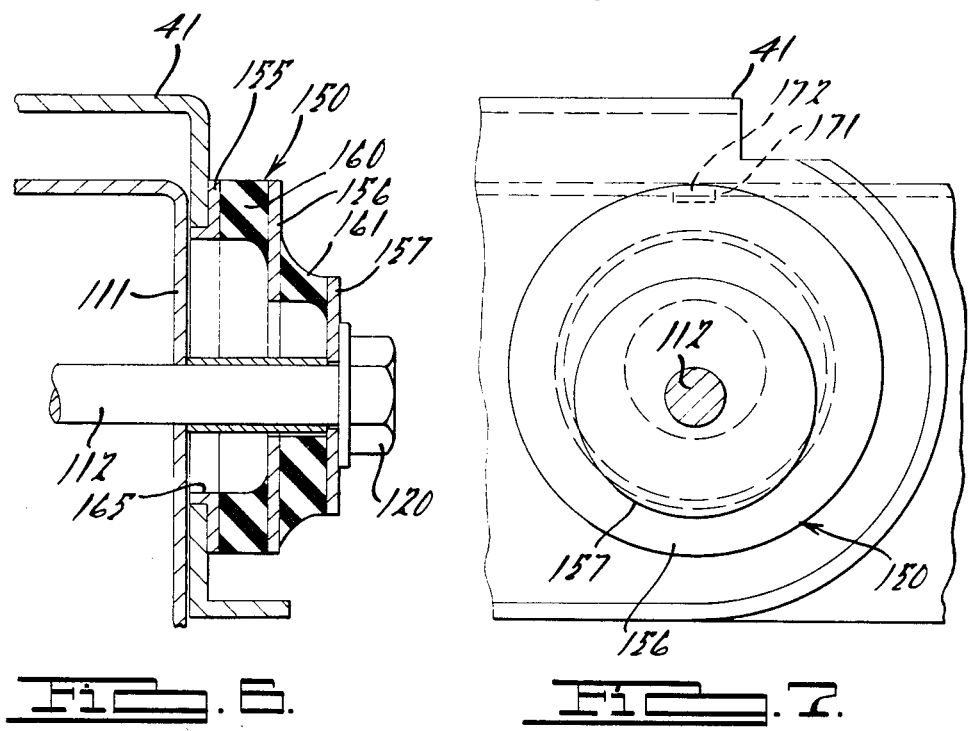

TUNABLE POWERTRAIN MOUNT

BACKGROUND OF THE INVENTION

1. Field of the Invention

This invention relates to suspensions for mounting powertrain components in a vehicle.

2. Prior Art

Various constructions are known for mounting powertrain components such as an engine and a transmission, in an automotive vehicle. For example, the rear of the powertrain can be mounted on an elongated cross member extending between spaced parallel frame rails of the vehicle frame.

Various couplings between the cross member and the frame rail are known. One such coupling includes the use of bolts directly connecting a cross member to the frame rail of an automobile. Such a non-shock absorbing coupling between the frame rail and cross member is typically used with a shock absorbing cushioning member between the cross member and the powertrain itself. Other couplings betweeen the cross member and frame rail include the use of various rubber members which are in compression.

For example, in prior art FIG. 1, the extremities of a cross member 10 can be relatively blade-like flat terminations which are positioned adjacent a rubber member 11 thereby forming a sandwich-like structure. A bracket 12 is attached to cross member 10 by a bolt 13 and can be coupled to a frame rail. Prior art FIG. 2 has spool-like rubber cushions 20 which have a central axial opening for passing a bolt 21. By coupling cross member 22 to bolt 21 and a frame rail bracket 23 to the exterior of rubber cushion 20, some shock and vibration isolation is provided by the rubber in compression. Prior art FIG. 3 uses rubber bushing 30 having a donut-shape coupled between a cross member 31 and a frame rail bracket 32. The powertrain is mounted on a shock absorbing bracket 33 which is attached to a central portion of cross member 31 and provides additional vibration isolation.

However, such known suspension structures as discussed above, provide only limited vibration and noise isolation. Solid rubber is very difficult to compress and does not provide the desired softness. Further, rubber in compression is difficult to tune to provide desired suspension characteristics. Some attempts have been made at tuning a solid piece of rubber by forming interior voids which provide for some deflection or deformation of the rubber when a load is applied.

The apparently conflicting requirements of vibration isolation and load carrying capacity often do not permit improved vibration isolation because of the need to maintain support of the engine powertrain. It would be desirable to have a suspension system for the powertrain which could be tunable to reduce specific vibrations and yet maintain a load bearing capacity sufficient to support the powertrain. These are some of the problems this invention overcomes.

Various non-linear suspensions are also known. For example, a non-linear wheel suspension includes a pair of spaced walls resiliently supporting a wheel therebetween. An elongated axle extends through opposed openings in the side walls so that the axle has end portions extending beyond the side walls. A wheel is rotationally mounted on the axle between the side walls. A pair of resilient shear discs couple end portions of the axle to an adjacent one of the side plates. Each shear disc includes a pair of spaced cover plates attached to an elastomer therebetween. One of the cover plates is attached to the axle and the other cover plate is attached to one of the side walls so that movement of the axle in a radial direction with respect to the side walls applies a shear force to the intermediate elastomer. A variation of such a wheel suspension includes having cover plates radially offset one from another to provide eccentric openings. An axle passing eccentrically through an opening has more radial suspension travel than an axle going concentrically through an opening of the same size. Thus, for a given size opening in a given size cover plate there is increased travel for an eccentrically mounted axle with respect to a concentrically mounted axle. Additionally, as a result, the wheel is mounted lower with respect to the supported object thus increasing clearance for projections extending from the object toward the wheel as well as for projections extending up from the travel surface of the wheel toward the suspended object. However, there still remains the unsolved problem of providing an improved powertrain mounting in a vehicle.

SUMMARY OF THE DISCLOSURE

This invention recognizes that the use of two double sheared discs at each end of a cross member supporting a powertrain for coupling to a frame rail provides tunable isolation and nonlinear load carrying capacity. That is, initial deflection of the cross member can be resisted by a relatively soft suspension and further deflection can be resisted using a relatively stiff suspension. As a result, good isolation is provided by the soft suspension and a good load carrying capacity is provided by the stiffer suspension.

Design rules for a tunable powertrain mount in accordance with an embodiment of this invention are:

$$\begin{pmatrix} F_1 \\ F_2 \end{pmatrix} = G\gamma \begin{pmatrix} a_1 \\ a_2 \end{pmatrix} ; \begin{pmatrix} x_1 \\ x_2 \end{pmatrix} = \gamma h \begin{pmatrix} 1 + \dfrac{a_1}{a_2} \\ 2 \end{pmatrix}$$

$$\begin{pmatrix} k_1 \\ k_2 \end{pmatrix} = \begin{pmatrix} F_1/x_1 \\ (F_2 - F_1)/(x_2 - x_1) \end{pmatrix} = \dfrac{Ga_1}{h} \begin{pmatrix} \dfrac{1}{1 + \dfrac{a_1}{a_2}} \\ \dfrac{a_2}{a_1} \end{pmatrix}$$

$$\begin{pmatrix} f_1 \\ f_2 \end{pmatrix} = \dfrac{1}{2\pi} \begin{pmatrix} \sqrt{\dfrac{2k_1 g}{F}} \\ \sqrt{\dfrac{1}{\dfrac{2k_2 g}{F_2 - F_1}}} \end{pmatrix}$$

wherein:

$F_i$—load at ith deformation stage
$x_i$—displacement at ith deformation stage
$k_i$—stiffness of stage i
$f_i$—frequency of stage i
$a_j$—area of jth layer
m—support mass
g—gravitational constant
G—shear modulus of elastomer
γ—maximum shear strain

DETAILED DESCRIPTION OF THE DRAWINGS

FIG. 1 is a prior art flat rubber sandwich powertrain mounting;

FIG. 2 is a prior art cylindrical rubber powertrain mounting;

FIG. 3 is a prior art donut-shaped rubber powertrain mounting;

FIG. 4 is a perspective view of an automobile powertrain support including a cross member coupled to a frame rail using suspension discs in accordance with an embodiment of this invention;

FIG. 5 is an exploded perspective view of a powertrain cross member support coupled to a frame rail in accordance with an embodiment of this invention;

FIG. 6 is a cross section view of a suspension disc in accoradance with an embodiment of this invention;

FIG. 7 is an end view of a suspension disc in accordance with an embodiment of this invention.

DETAILED DESCRIPTION OF THE INVENTION

Figure 8:
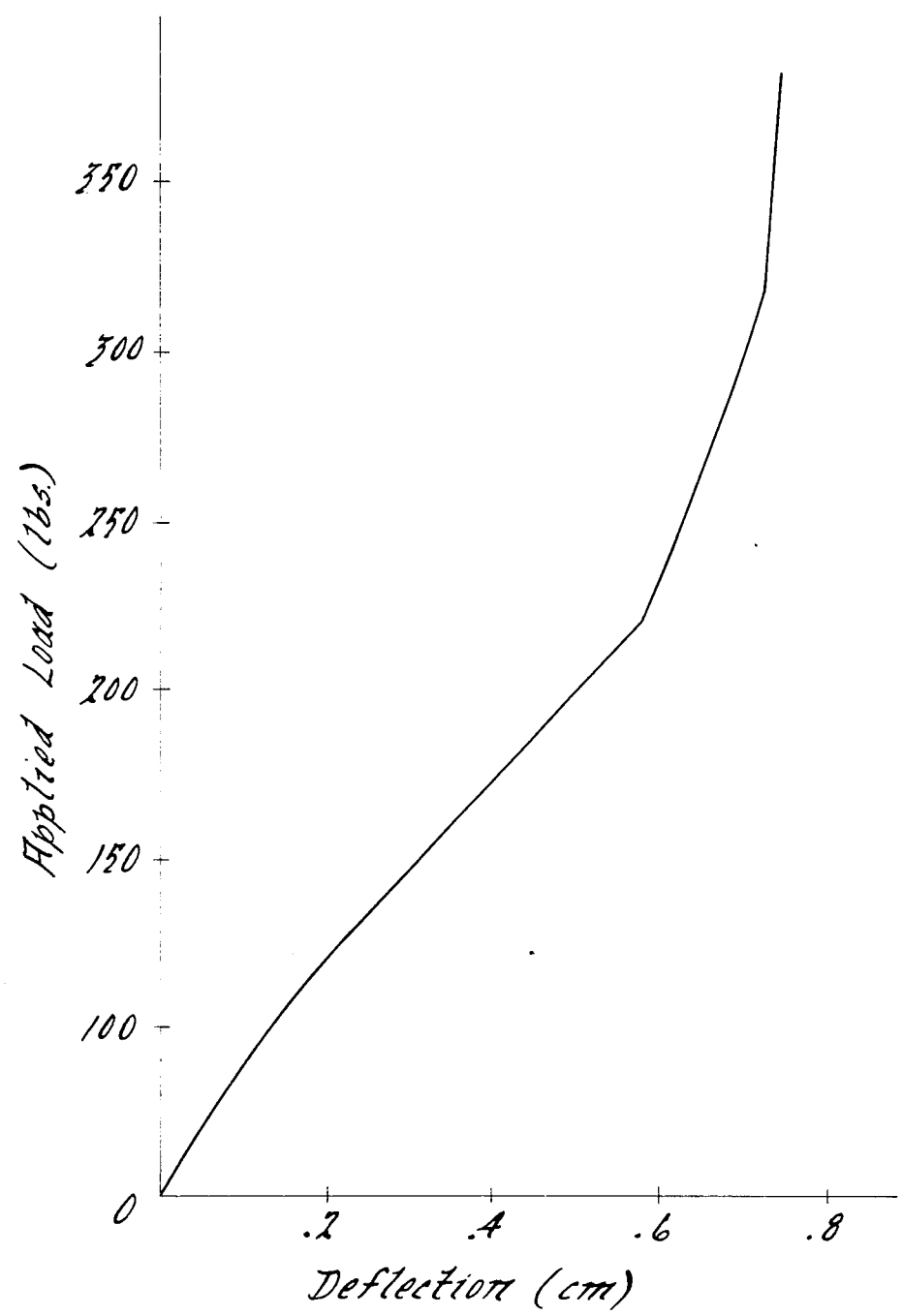
FIG. 8 is a graphical representation of the applied load versus deflection suspension characteristics of a sheared disc in accordance with an embodiment of this invention.

Referring to FIG. 4, powertrain 40 includes an engine and a transmission mounted on a powertrain mount 110 including a pedestal coupling 43 attached to a cross member 111. Powertrain mount 110 also includes a resilient connection 150 which couples cross member 111 to a bracket 41 attached to a vehicle frame rail 42. Referring to FIG. 5, cross member 111 is supported at each end by a bolt 112. Bolt 112 passes through a pair of aligned and opposing openings 119 in a pair of spaced planar and generally parallel side walls 114. Resilient connection 150 is positioned between the ends of bolt 112 and side walls 114. Nuts 120 are at the end of bolt 112 and provide a compression force on resilient connection 150.

Resilient connection 150 includes two pairs of spaced elastomeric members 160 and 161 and three pairs of cover plates 155, 156 and 157. Cover plates 155, 156 and 157 each have a central axial opening defining an inner diameter and a circular periphery defining an outer diameter. Inner cover plates 155 each have protruding annular bosses 165 for sitting in openings 119 of side walls 114. The cover plates are positioned eccentrically with respect to each other so that the center of cover plate 156 is lower than the center of cover plate 155, and the center of cover plate 157 is lower than the center of cover plate 156 (FIGS. 6 and 7). Thus elastomeric members 160 and 161 have inside and outside diameters eccentric to each other. The eccentric configuration eliminates some clearance space below bolt 112 and the lower outside portion of resilient connection 150. That is, if the system were concentric without the offsets of the cover plates, the space below bolt 112 would equal the space above bolt 112. As a result, the inside and outside diameters of the cover plates and the elastomeric members can be reduced and there can be increased clearance between the resilient connection and the travel surface for cross member 111.

The pair of cover plates 155 is adjacent to the exterior of side walls 114 around openings 119. Continuing successively outward from cover plates 155, there is a pair of elastomeric members 160, a pair of cover plates 156, a pair of elastomeric members 161 and a pair of cover plates 157. Nuts 120 abut the outermost extremity of resilient connection 150 and can be tightened to apply compressive force to resilient connection 150. Elastomeric members 160 and 161 are each bonded to the adjacent cover plates 155 through 157 so that deflection of cover plates 155 through 157 causes a shear force to be applied to elastomeric members 160 and 161.

Both the elastomeric members and the cover plates have decreasing diameters as resilient connection 150 extends outwardly from side walls 114 to the connection with bolt 112. The inner diameter of outermost cover plates 157 is substantially equal to the outer diameter bolt 112 and responds immediately to movement of bolt 112. The deflection created by such movement is applied primarily to the adjacent elastomeric members 161. However, lower rates of shear deformation are also applied to elastomeric members 160. When bolt 112 has deflected sufficiently to engage the larger inner diameter of the next innermost cover plates 156, then cover plates 156 also move with further movement of bolt 112. As a result here is no further increase in the applied shear force to elastomeric members 161 but there is an increase in the applied shear force in the elastomeric members 160 inward of cover plates 156. Finally, when the outer surface of bolt 112 reaches the innermost diameter of cover plates 155, no further increase in the shear forces is applied to elastomeric members 160 and 161 and no further deflection of bolt 112 may be realized.

The above-described sequence in the increase in stiffness introduced successively by stopping elastomeric members 160 and 161 from further deformation provides a nonlinear suspension system. That is, when the two cover plates adjacent an elastomeric member both contact bolt 112 there is no further deformation of the elastomeric member between the cover plates and wheel suspension has an increased stiffness. Such a suspension system is particularly advantageous because there can be effective damping of a relatively broad range of travel of cross member 111 without it being necessary to have a particularly high force resisting deflection at the beginning of travel of cross member 111. Instead, there can be a substantial increase in the damping force as cross member 111 approaches the end of its travel.

Advantageously, cover plates 155 through 157 are made of a metal which is nonresilient and is easily attached to both side walls 114 and elastomeric members 160 and 161. Elastomeric members 160 and 161 are sufficiently resilient that the opposing major faces of each member can be displaced with respect to each other by distances equal to the differences between gaps upward from the bolt adjacent the cover plates. That is, following the direction of suspension travel, the elastomeric member must be able to absorb the difference in movement of adjacent cover plates which is equal to the difference in radial spacing between the upper interior boundaries of adjacent cover plates. The material of the elastomeric member is chosen so that for this displacement there is a desired shear force resistance. The size and the numbers of layers of elastomer will be determined for each application according to the payload range and the desired dynamic characteristics of the system which includes the powertrain and the vehicle.

Referring to FIG. 7, an end view of resilient member 150 shows the offset of the concentric cover plates 155, 156 and 157. Additionally, an indentation 171 at the top edge of cover plate 155 aligns with a pin 172 protruding from the side of side member 114. The correct rotational orientation of resilient member 150 is important so that the offset centers of cover members 155 through 157 are along the line of suspension travel of cross member 111. That is, if the line of suspension travel is angled with respect to the line connecting the centers of the cover plates, travel distance is reduced from its maximum possible. Reduced suspension travel limits performance of the suspension system. If resilient member 150 were mounted upside down there would be substantially reduced suspension travel. Compared to cover plates having an outer periphery which is eccentric with respect to the periphery of the central opening of the same cover plate, fabrication of concentric, annular cover plates is easier. With eccentric cover plates it would be necessary to make sure each cover plate is in the correct relative rotational position with respect to the other cover plate. With concentric cover plates the relative rotational position of each cover plate is not important.

The amount of shear stiffness applied by elastomeric members 160 and 161 is also dependent upon the radial extent of each of the members. As shown in FIG. 6, the outer diameters of elastomeric members 160 and 161 are also decreased in accordance with the decreasing inner diameters of the elastomeric member 160 and 161. However, because of the offset of the intervening cover plates the inner and outer diameters of the elastomeric members 160 and 161 are eccentric with respect to one another. The outer diameters of cover plates 155 through 157 also decrease. It should be recognized that the force resisting deflection provided by resilient connection 150 can be varied by varying the outer diameter of the elastomeric members and cover plates. Further, the inner and outer diameters of each of the cover plates and each of the elastomeric members need not be constant with axial distance along bolt 112. For example, the outer diameter of elastomeric members may vary so that there is a smooth connection between the outer diameters of adjacent cover plates.

Typical dimensions for resilient member 150 are:

| Cover Plate | Inside Diameter (inches) | Outside Diameter (inches) | Offset from Centerline of 55 (inches) | Thickness |
|---|---|---|---|---|
| 155 | 1.58 | 2.38 | 0 | 0.079 |
| 156 | 0.85 | 2.38 | 0 | 0.079 |
| 157 | 0.39 | 1.63 | 0.181 | 0.079 |

The design equations for determining the parameters of resilient member 150 are:

$$\begin{pmatrix} F_1 \\ F_2 \end{pmatrix} = G\gamma \begin{pmatrix} a_1 \\ a_2 \end{pmatrix} ; \begin{pmatrix} x_1 \\ x_2 \end{pmatrix} = \gamma h \begin{pmatrix} 1 + \dfrac{a_1}{a_2} \\ 2 \end{pmatrix}$$

$$\begin{pmatrix} k_1 \\ k_2 \end{pmatrix} = \begin{pmatrix} F_1/x_1 \\ (F_2 - F_1)/(x_2 - x_1) \end{pmatrix} = \dfrac{Ga_1}{h} \begin{pmatrix} \dfrac{1}{1 + \dfrac{a_1}{a_2}} \\ \dfrac{a_2}{a_1} \end{pmatrix}$$

-continued $$\begin{pmatrix} f_1 \\ f_2 \end{pmatrix} = \dfrac{1}{2\pi} \begin{pmatrix} \sqrt{\dfrac{2k_1 g}{F}} \\ \sqrt{\dfrac{1}{\dfrac{2k_2 g}{F_2 - F_1}}} \end{pmatrix}$$

wherein:
$F_i$—load at ith deformation stage
$x_i$—displacement of ith deformation stage
$k_i$—stiffness of stage i
$f_i$—frequency of stage i
$a_j$—area of jth layer
m—support mass
g—gravitational constant
G—shear modulus of elastomer
$\gamma$—maximum shear strain The applied load versus deflection suspension characteristics of a resilient member design in accordance with an embodiment of this invention are shown in FIG. 8. The two elastomers and three cover plates permit a tuned nonlinear suspension particularly adapted to a powertrain.

Various modifications and variations will no dobut occur to those skilled in the various arts to which this invention pertains. For example, the outer dimensions of the cover plates and elastomeric members may be varied from that disclosed herein. These and all other variations which basically rely on the teachings through which this disclosure has advanced the art are properly considered within the scope of this invention.

I claim:
1. A tunable powertrain mount for the powertrain of a vehicle including:
   a shear disc suspension adapted to be coupled between a frame rail and a cross member of an automobile, said cross member being adapted to be coupled to the vehicle powertrain;
   said shear disc suspension including a first and a second elastomer disc, said first disc being positioned between a first and a second support plate and said second elastomer disc being positioned between said second and a third support plate, said first and second elastomer discs being tunable so that deflection of said powertrain with respect to said frame rail deflects said first elastomer disc to a maximum deflection and further deflection depends upon the resistance provided by said second elastomer disc; and
   said shear disc suspension is in accordance with the formula in matrix form:

$$\begin{pmatrix} F_1 \\ F_2 \end{pmatrix} = G\gamma \begin{pmatrix} a_1 \\ a_2 \end{pmatrix} ; \begin{pmatrix} x_1 \\ x_2 \end{pmatrix} = \gamma h \begin{pmatrix} 1 + \dfrac{a_1}{a_2} \\ 2 \end{pmatrix}$$

$$\begin{pmatrix} k_1 \\ k_2 \end{pmatrix} = \begin{pmatrix} F_1/x_1 \\ (F_2 - F_1)/(x_2 - x_1) \end{pmatrix} = \dfrac{Ga_1}{h} \begin{pmatrix} \dfrac{1}{1 + \dfrac{a_1}{a_2}} \\ \dfrac{a_2}{a_1} \end{pmatrix}$$

$$\begin{pmatrix} f_1 \\ f_2 \end{pmatrix} = \frac{1}{2\pi} \begin{pmatrix} \sqrt{\frac{2k_1 g}{F}} \\ \sqrt{\frac{1}{\frac{2k_2 g}{F_2 - F_1}}} \end{pmatrix}$$

wherein, f is load at each deformation stage; x is displacement at each deformation stage; k is stiffness at each deformation stage, f is frequency at each deformation stage; a is area of each disc layer; m is related to the support mass; g is the shear modulus of the elastomer; q is the maximum shear strain; and h is the thickness at each elastomer stage; and wherein there are two shear disc suspensions at each end of said cross member and a first extremity of each of said two shear disc suspensions is coupled to said cross member and a second extremity of each of said two shear disc suspensions is coupled to said frame rail.

2. A powertrain mount for a vehicle powertrain includes:

a cross member extending transversely across the vehicle and supporting the vehicle powertrain at a central portion;

a pair of frame rail members extending generally parallel to each other along the sides of the vehicle, each frame rail having a bracket with a pair of spaced sidewalls having opposing openings for coupling to said cross member;

an elongated bolt means for passing through the opposing openings and coupling to said cross member, the diameter of said bolt means being smaller than the diameter of said opposing openings thereby permitting radial movement of said bolt means and corresponding movement of said cross member;

a resilient connection between each end of said bolt means and an adjacent sidewall;

each resilient connection including a first and a second elastomer member, said first elastomer member being positioned between a first and a second cover plate and said second elastomer discs being positioned between said second and a third cover plate, said first and second elastomer discs being tunable so that deflection of said powertrain with respect to said frame rail deflects said first elastomer disc to a maximum deflection and further deflection depends upon the resistance provided by said second elastomer disc, substantially in accordance with the formula:

$$\begin{pmatrix} F_1 \\ F_2 \end{pmatrix} = G\gamma \begin{pmatrix} a_1 \\ a_2 \end{pmatrix} ; \begin{pmatrix} x_1 \\ x_2 \end{pmatrix} = \gamma h \begin{pmatrix} 1 + \frac{a_1}{a_2} \\ 2 \end{pmatrix}$$

$$\begin{pmatrix} k_1 \\ k_2 \end{pmatrix} = \begin{pmatrix} F_1/x_1 \\ (F_2 - F_1)/(x_2 - x_1) \end{pmatrix} = \frac{Ga_1}{h} \begin{pmatrix} 1 \\ \frac{1 + \frac{a_1}{a_2}}{\frac{a_2}{a_1}} \end{pmatrix}$$

$$\begin{pmatrix} f_1 \\ f_2 \end{pmatrix} = \frac{1}{2\pi} \begin{pmatrix} \sqrt{\frac{2k_1 g}{F}} \\ \sqrt{\frac{1}{\frac{2k_2 g}{F_2 - F_1}}} \end{pmatrix}$$

wherein:
$F_i$—load at ith deformation stage
$x_i$—displacement of ith deformation stage
$k_i$—stiffness of stage i
$f_i$—frequency of stage i
$a_j$—area of jth layer
m—support mass
g—gravitational constant
G—shear modulus of elastomer
$\gamma$—maximum shear strain said first cover plate is coupled to said bolt means and said third cover plate is coupled to one of said side walls so that movement of said bolt means in a radial direction with respect to said sidewalls applies a shear force to said first and second elastomer members and a force resisting deflection to the powertrain mount;

said first of said cover plates is annular with concentric first inner and outer diameters, said first inner diameter being substantially equal to the diameter of said bolt means so that radial movement of said bolt means causes corresponding radial movement of said first cover plate thereby applying a shear force to said first elastomer member and thus resisting motion of said bolt means with respect to said side plate;

said third of said cover plates is annular with concentric second inner and outer diameters, said second inner diameter being sufficiently larger than the diameter of said bolt means to permit some radial movement of said bolt means which movement is limited by interference with the innermost boundary of said opening in said side plate and said inner diameter of said third cover plates; and said first and third cover plates being positioned eccentrically of each other so that the center of said first cover plate is radially offset from the center of said third cover plate.

3. A tunable powertrain mount as recited in claim 2 wherein said first elastomer member has an outer boundary extending between the outer diameter of said first and second cover plates and an inner diameter extending between the inner diameter of said first and second cover plates so that said first elastomer member is generally disc-shaped with an inside diameter and an outside diameter eccentric to each other.

4. A tunable powertrain mount as recited in claim 3 further comprising an adjustable compression means axially positionable along said bolt means to provide a compressive force on said first and second elastomer member thereby reinforcing the bonding force between said elastomer members and said cover plates.

5. A tunable powertrain mount as recited in claim 4 wherein said second cover plate is positioned eccentrically of both said first and third cover plates, so that said cover plates are successively deflectable by said bolt means and a shear deformation occurs at successively increasing rates to said first and second elastomer members and there is a successive stopping of additional shear deformation to said first and second elastomer members.

6. A tunable powertrain mount as recited in claim 5 wherein said sidewalls and said resilient connection include an alignment means so as to orient the direction of eccentric offset of said resilient connection with respect to said sidewalls.

* * * * *